United States Patent [19]

Cull

[11] Patent Number: 5,724,912
[45] Date of Patent: Mar. 10, 1998

[54] APPARATUS AND METHOD FOR SENSING THE LEVEL OF A FLUENT SOLID MATERIAL

[75] Inventor: Thomas J. Cull, Decatur, Ill.

[73] Assignee: The GSI Group, Inc., Assumption, Ill.

[21] Appl. No.: 538,910

[22] Filed: Oct. 4, 1995

[51] Int. Cl.⁶ .................... A01K 5/00; H01H 35/00
[52] U.S. Cl. ............................. 119/57.2; 119/57.3
[58] Field of Search ......................... 119/57.2, 57.4, 119/57.3, 61; 222/56, 64; 340/612, 615, 617

[56] References Cited

U.S. PATENT DOCUMENTS

| | | |
|---|---|---|
| 3,033,163 | 5/1962 | Hostetler . |
| 3,598,087 | 8/1971 | Ramser .................... 119/51.11 |
| 5,311,839 | 5/1994 | Pollock et al. ............... 119/53 |

OTHER PUBLICATIONS

Cumberland "Cycle Plus Pan Feeder—Installation and Operational Manual", see pp. 38 and 45.
Cumberland Brochure "Quality You Can Count On", see pp. 19, 21, 29 and 36.

*Primary Examiner*—John J. Wilson
*Assistant Examiner*—Yvonne R. Abbott
*Attorney, Agent, or Firm*—Polster, Lieder, Woodruff & Lucchesi

[57] ABSTRACT

A poultry feeder conveyor control unit (63) of the present invention comprises a drop feeder adapted to be attached to an overhead feed conveyor (5). The feed conveyor has a conveyor element (11) moveable within a feed conduit (9) for conveying poultry feed in axial direction of the conveyor conduit, and a plurality of other poultry feeders (7) spaced at intervals along the path of the conveyor conduit. The control unit is positioned at a desired location along the length of the conveyor conduit. The control unit has an electric motor (75) having an output shaft (77) rotatable driven by the motor, and a paddle (79) carried by the output shaft. The motor is mounted within the control unit such that upon the feed in the feeder tube attaining a predetermined level, the paddle will engage the feed with the latter stopping rotation of the motor. An electrical circuit is provided for generating a signal in response to stoppage of rotation of the motor by the feed upon the latter attained the predetermined level with this signal controlling operation of the feed conveyor. Other applications and methods of using such an electric motor to detect the level of a dry, fluent material are also disclosed.

17 Claims, 3 Drawing Sheets

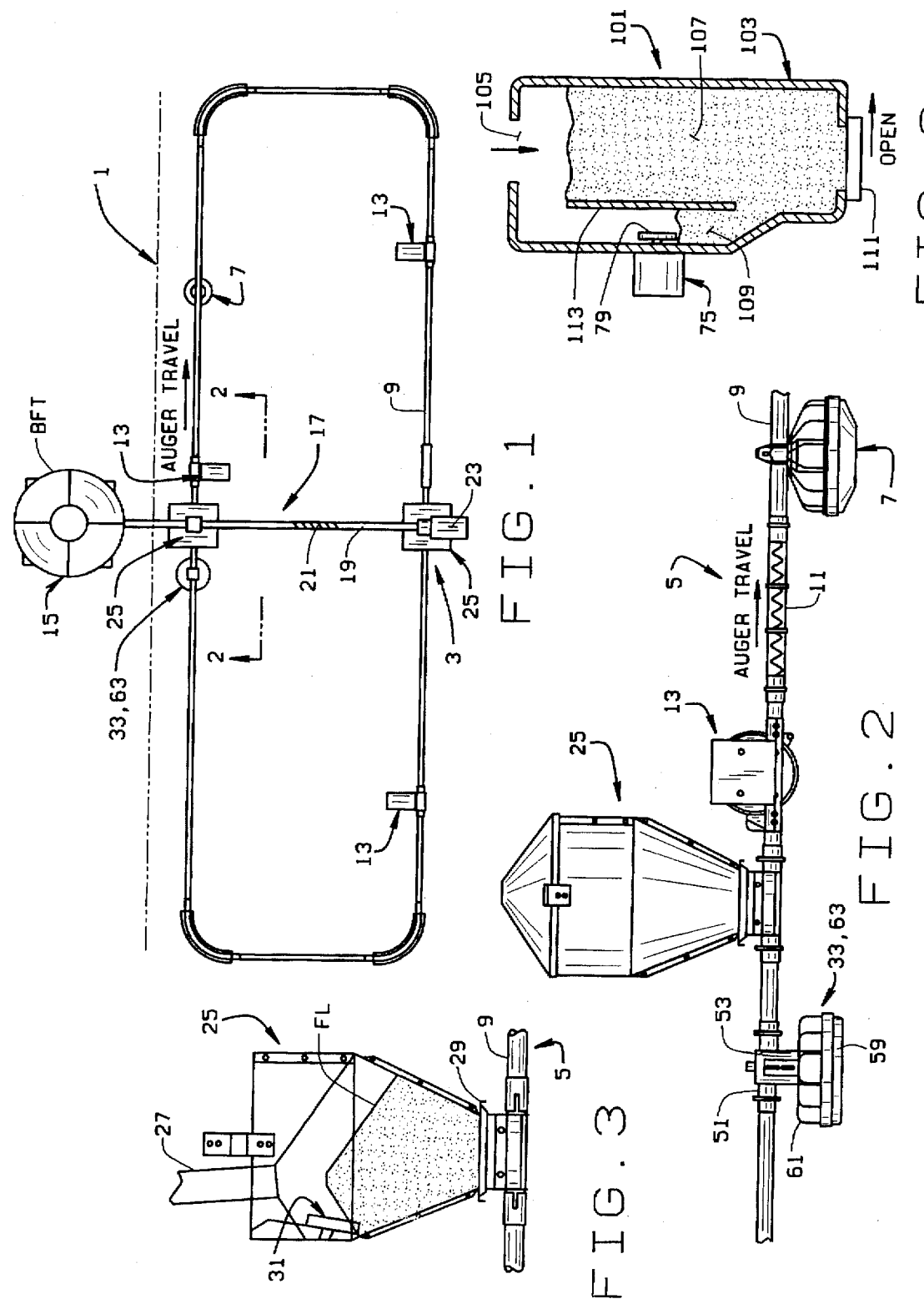

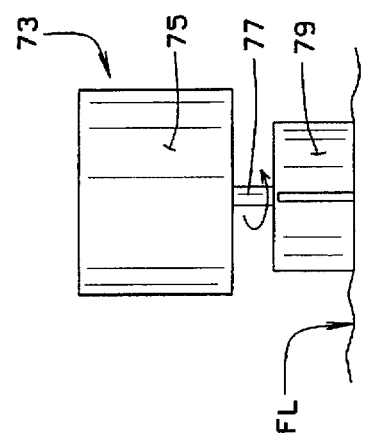
FIG. 7
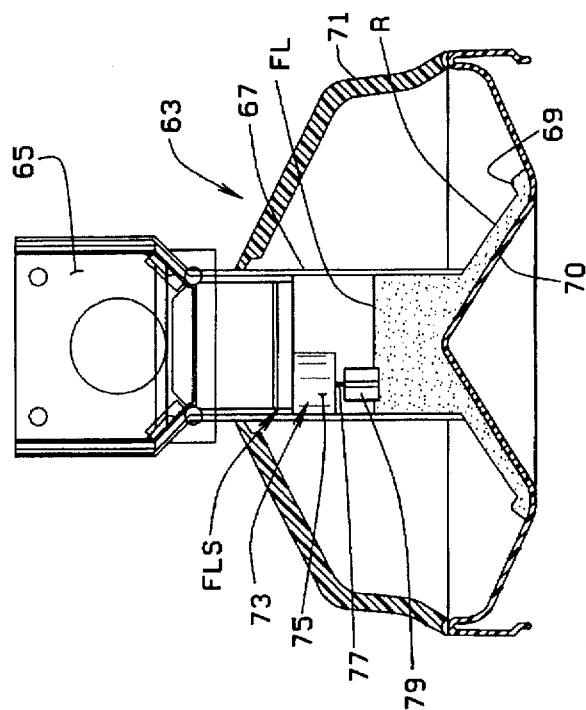
FIG. 6
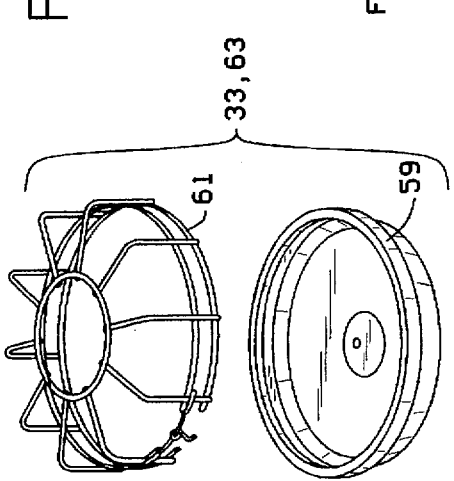
FIG. 10
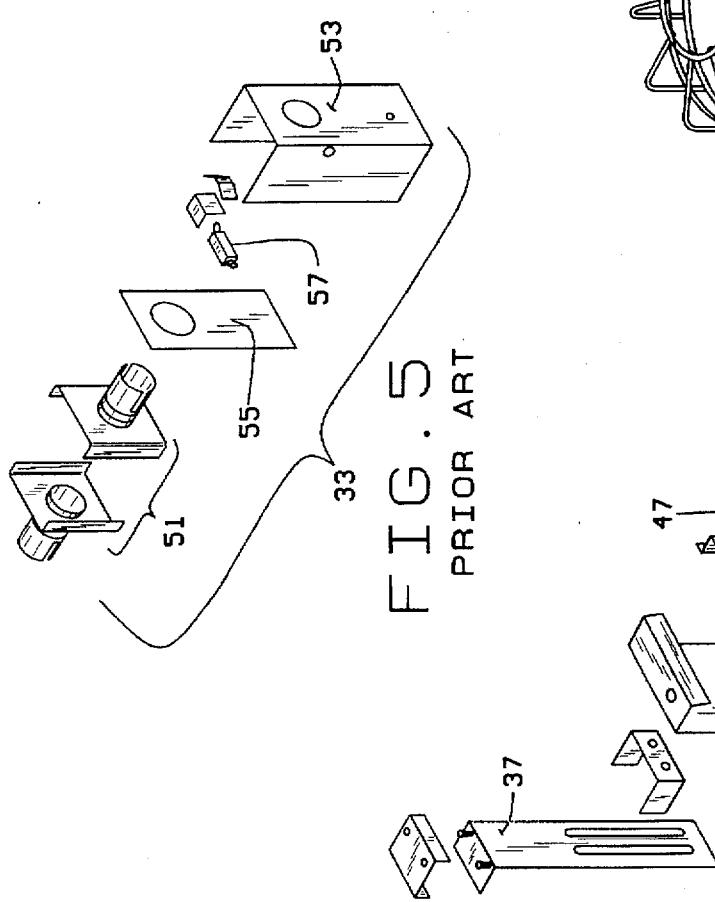
FIG. 5 PRIOR ART
FIG. 4 PRIOR ART

APPARATUS AND METHOD FOR SENSING THE LEVEL OF A FLUENT SOLID MATERIAL

BACKGROUND OF THE INVENTION

This invention relates to a apparatus for and a method of sensing the level of a fluent material in a container or vessel, and more particularly to a feed level or pan fill control for a poultry feeding system or the like. As used in this specification, a "fluent" material is defined as a dry, solid powdered or granular material which is capable of flowing. Examples of such fluent materials may include, but are not limited to animal or poultry feed, grain, flour, cement, plastic pellets, dry chemicals and other powders. Generally, it has been more difficult to sense the level of a fluent material in a vessel or other container than to sense the level of a liquid in a container. This difficulty is due in part to the fact that the sensor element for measuring the level of a solid fluent material is not buoyant with the fluent material as a float would be in a liquid such that floatation sensors are not applicable for such flowable solid materials.

In commercial poultry growing operations, it is conventional to raise 20,000–40,000 or more birds (chickens) in a poultry house. These poultry houses may be 40–60 feet wide and several hundred feet long. In order to feed the birds, an automated feeding system is provided. Typically, such an automated feeding system includes one or more bulk feed tanks (BFTs) located outside of the poultry house. Feed trucks deliver feed to these BFTs. Poultry feed is a dry fluent material made of soybean meal and/or cornmeal with other additives and feed supplements. Depending on the mix of the rations to be fed to the birds (which changes as the birds mature), and depending on the weather, the composition and the flowability characteristics of the feed can vary greatly. A feed conveyor conveys feed from the BFTs into the poultry house. A multiplicity (e.g. several hundred) of poultry feeders are located within the poultry house and are automatically supplied feed from the feed conveyor. The feed conveyor may be any one of a variety of types conventionally used in the poultry field. For example, the conveyor may be a closed tube in which a helical auger in housed, and the auger may either be rotary driven so as to screw convey the feed axially through the tube, or, alternatively, the auger may be axially driven through the tube so as to axially transport the feed through the tube. In other poultry feeding systems, at least part of the feed conveyor may include open troughs through which the auger runs such that the birds may eat the feed from the open trough. In systems employing so-called drop feeders, as the feed is conveyed within the conveyor tube from feeder to feeder, it will drop from the conveyor tube into a drop tube associated with each of the feeders. More specifically, at a first feeder or feeders along the conveyor, the feed will fill a feeding pan carried by the feeder and, after the feeder pan in filled, the drop tube will be filled. After the drop tube is filled, feed conveyed within the conveyor tube will be conveyed past the filled feeder to next feeder which are not fully filled with feed. Thus, the remainder of the feeders will become filled with feed.

Heretofore, such poultry feeder systems were controlled such that after all of the feeders in the line of feeders were filled with feed, the feed conveyor would be turned off. This could either be accomplished by operating the feed line for a predetermined time calculated to fill all of the feeders, or by a sensor (usually a switch operated by a paddle engageable by the feed) could be provided in the last feeder of the feeder line to sense when the last feeder was filled with feed and to shut off the conveyor. However, the use of a timer to control the feed conveyor could cause a problem if the birds do not eat as much feed as predicted. When the timer operates the conveyor for its set time, the feeders and the feed conveyor can become filled with feed and the feed conveyor will continue to be operated which can, as explained below, lead to possible jamming of the feed conveyor or to spillage of the feed. With prior art systems that were controlled by prior art feed sensors, in certain instances the sensors were not sufficiently sensitive to the feed such that when the last feeder became filled with feed, the sensor may not accurately sense that its feeder has, in fact, become filled with feed and thus the feed conveyor would continue to operate which, again, could lead to overcompaction of feed within the conveyor tube and jamming of the conveyor.

It is particularly advantageous that upon completion of a feeding cycle that all of the feeders be filled with feed and that the conveyor tube between adjacent feeders is filled with feed so as to insure that the birds will have adequate rations and so, upon startup of the conveyor for the next feeding cycle, some feed (i.e., the feed in the conveyor tube between the feeders) is immediately supplied to all of the feeders. It has been recognized that the birds often associate the noise of the startup of the feed conveyor with the delivery of feed to the feeders. If only a few of the feeders are initially supplied with feed, the birds may become excited and attempt to feed from the few feeders that are initially supplied with feed. This can result in injury or even death to some of the birds. By insuring that the conveyor tube between feeders is substantially filled with feed, upon startup of the feed conveyor, all of the feeders (which may be empty) will initially have some feed delivered thereto substantially simultaneously.

In systems where the feed conveyor is controlled by a timer, the conveyor drive may be turned off before all of the feeders were fully filled or before the conveyor tube between the filled feeders was fully charged with feed such that upon startup of the feed conveyor feed would not be simultaneously delivered to all of the feeders. If the timer allowed the feed conveyor to operate for a period after the feeders were filled, feed would either be spilled out the end of the conveyor if a screw-type auger conveyor were used, or the feed could become over-compacted in the feed conveyor tube. In systems controlled by a prior art feed sensitive switch, if the switch would not reliably sense the presence of feed in the control unit, continued operation of the feed conveyor could lead to jamming of the conveyor.

As noted, if the prior art feed conveyors would continue to operate after all of the feeders and the feed conveyor conduit were fully filled, overloading of the conveyor tube with feed (which may cause the auger to jam within the tube) can result. More specifically, in a closed loop, axially driven feed conveyor system, such as described in U.S. Pat. No. 4,460,230, continued operation of the feed conveyor after all of the feeders in the conveyor loop and after the conveyor tube were substantially filled with would often result in additional feed being packed into the conveyor tube. This overcompaction of the conveyor tube often resulted in jamming of the auger within the conveyor tube. It will be appreciated that due to a the fact that the static coefficient of friction of the stationary auger and the overcompacted feed within the conveyor tube is significantly greater that the moving coefficient of friction, once the auger becomes overcompacted with feed and stops (either because the auger can no longer be driven through the conveyor tube along with the overcompacted feed therein or because the conveyor drive is stopped in the normal manner), it oftentimes would be impossible to initiate operation of the auger using the drive. Thus, it would become necessary to disassemble the feed conveyor and to remove large sections (e.g., hundreds of feet) of the auger from the conveyor tube to remove excess feed to thus enable the auger to be again driven within the conveyor tube. Of course, this is a time consuming and difficult job since the auger may be several hundred feet long. It will also be appreciated that with perhaps 40,000 or more birds in the poultry house, tons of feed must be delivered to the feeder each day thus making it impractical (if not impossible) to manually feed the birds.

As previously noted, poultry equipment manufacturers have introduced control units installed in the conveyor feed line to sense when the last feeder on the feed conveyor (or some other designated feeder) is provided with a sensor to determine when that feeder has a predetermined amount of feed delivered thereto. This sensor is responsive to the amount of feed within the selected control feeder such that upon the feed delivered to this control feeder exceeding some predetermined value, the sensor generates a signal which actuates a control to turn off (or otherwise de-energize) the conveyor drive motor and to thus prevent continued operation of the conveyor so as to prevent over-compaction of feed within the conveyor tube.

As was typical, such prior art control units (as shown in FIGS. 4 and 5 of the present disclosure) often employed a pivotally mounted paddle disposed generally vertically and exposed to the feed delivered to the control feeder or to another vessel within which the feed level it to be controlled, with the paddle operating a micro-switch or the like. As feed is delivered to the feeder from the conveyor tube, the feed is directed toward the paddle causing the latter to rotate. This rotational movement actuated a micro-switch which, in response to a predetermined amount of movement of the paddle, caused a signal to be generated which corresponds to a desired amount of feed being delivered to this control unit. Of course, this signal can then be used to control operation of the conveyor drive.

Reference may be made to such as U.S. Pat. Nos. 3,033,163, 3,598,087 and 5,311,839 which disclose prior art feed pan feed switches for detecting the level of feed with a control feed pan.

There have been certain short comings of such prior art control units. For example, it has been found that such paddle switch control units are not sufficiently sensitive to a quantity of feed in the control unit to effect pivoting of the paddle so as to generate the control signal in response to the same quantity of feed being deposited in the control unit upon each cycle of the feed conveyor. Further, as the composition (i.e., the density and flowability) of the feed is changed, the paddle sensor may not be moved through a sufficient distance so as to actuate the micro-switch to generate the control signal. In addition, the mechanical linkages of such prior art control units required that the switch and paddle within the control unit be accurately rigged so as to insure that the switch would be tripped when a desired quantity of feed was present. However, the actuation point of the switch could readily go out of adjustment and the mechanical parts (e.g., the pivotal paddle and the micro-switch) were subject of build up of feed and other material that may have a deleterious affect on their operation. There has been a need for a sensor which is responsive to the presence or absence of feed at a particular level in a feeder such that the operation of the feed conveyor can readily be controlled by the signal generated by the sensor.

SUMMARY OF THE INVENTION

Among the several objects and features of the present invention may be noted the provision of a control unit for a poultry feed conveyor in which the feed level sensor reliably senses the level of the feed within the control unit and which is not susceptible to mechanical adjustment variations or to accumulated feed or dirt;

The provision of such a feed level sensor which is actuable in response to the level of the fluent materials of widely different densities and flowability characteristics;

The provision of such a feed level sensor is relatively small in size and which can be positioned in any number of desired locations within a feeder; and The provision of such a feeder level sensor which is of low cost, which is of simple and economical construction, which is reliable in operation, and which has a long service life.

Briefly stated, a sensor of the present invention for detecting a predetermined level of a solid, fluent material, said sensor comprises an electric motor having an output shaft which rotates upon energization of the motor. Means is provided for energizing the motor, and means is mounted on the output shaft of the motor and is rotatable therewith for engagement with the solid, fluent material when the latter is at or above the predetermined level thereby to stop rotation of the output shaft. Means responsive to the stoppage of rotation of the output shaft is provided for indicating that the fluent material has attained its predetermined level.

A poultry feeder conveyor control unit of the present invention comprises a drop feeder adapted to be attached to an overhead feed conveyor. The feed conveyor has a conveyor element moveable within a feed conduit for conveying poultry feed in axial direction of the conveyor conduit, and a plurality of drop poultry feeders spaced at intervals along the path of the conveyor conduit. The control unit is positioned at a desired location along the length of the conveyor conduit. Each of the feeders including the control unit has a drop tube which receives feed from the conveyor conduit and a feed pan into which feed from the drop tube is delivered and from which the birds consume the feed. The control unit has an electric motor having an output shaft rotatable driven by the motor, and a paddle carried by the output shaft, the motor being mounted within the feeder such that upon the feed in the feed pan or in the drop tube attaining a predetermined level, the paddle will be in contact with the feed with the latter stopping rotation of the paddle, output shaft and the rotor. Means is provided for generating a signal in response to stoppage of rotation of the paddle by the feed upon the latter attained the predetermined level with this signal controlling operation of the feed conveyor.

Other objects and features of the present invention will be in part apparent and in part pointed out hereinafter.

BRIEF DESCRIPTION OF THE DRAWINGS

FIG. 1 is a diagrammatic view of a poultry house having a closed loop feeder system in which an endless flexible auger is driven axially through a loop of feed conveyor conduit for delivering feed to a plurality of feeders located along the feed conveyor conduit, and further illustrating a rotatably driven auger for conveying feed from a bulk feed tank outside of the poultry house to hoppers located within the house with the hoppers supplying feed to the endless loop feed conveyor with the feed conveyor having a control pan which includes a sensor of the present invention for sensing the level of feed delivered to or remaining in the control pan for controlling operation of the feed conveyor and with the hopper having a sensor of the present invention for controlling operation of the feed conveyor which delivers feed from the tank to the hopper;

FIG. 2 is a side elevational view of a portion of the feed conveyor shown in FIG. 1 on a somewhat enlarged scale illustrating the feed hopper, the drive for the feed conveyor, and the control pan for the feed conveyor;

FIG. 3 is a cutaway view of the feed hopper showing a feed level control sensor of the present invention located therein for controlling operation of the feed delivery conveyor which conveys feed from the bulk feed tank to the hopper;

FIG. 4 is an exploded view of a prior art feed level switch for controlling the amount of feed delivered to the feed hopper;

FIG. 5 is an exploded view of a prior art feed level switch in a control pan installed in feed conveyor line to control the amount of feed conveyed to the feed control pan which is preferably installed at the end of the feed conveyor;

FIG. 6 is a cross sectional view of a control pan of the present invention having an improved sensor of the present invention installed within the drop tube of the control pan for sensing the level of feed within the control pan and for generating a signal in response to the presence (or absence) of feed at a desired level with the control pan for controlling operation of the feed conveyor delivering feed to the feeders and to the control pan;

FIG. 7 is a side elevational view on an enlarged scale of a miniature motor having a rotating output shaft on which a paddle is mounted to rotate with the output shaft when the motor is energized with the paddle holding the motor from rotating when the paddle is in engagement with feed (or other fluent material) at a desired level within the control pan or with the hopper;

FIG. 9 is a diagrammatic view of a drop feeder (or other feed reservoir) in which after a predetermined quantity of feed is loaded into the drop feeder, a feed sensor of the present invention senses when this predetermined quantity of feed has been deposited in the feeder and the sensor generates a signal to cutoff the flow of feed into the drop feeder; and FIG. 10 is a perspective view of a feed pan and a wire grill for use with a feed pan.

Corresponding reference characters indicate corresponding parts throughout the several views of the drawings.

DESCRIPTION OF A PREFERRED EMBODIMENT

Figure 8:
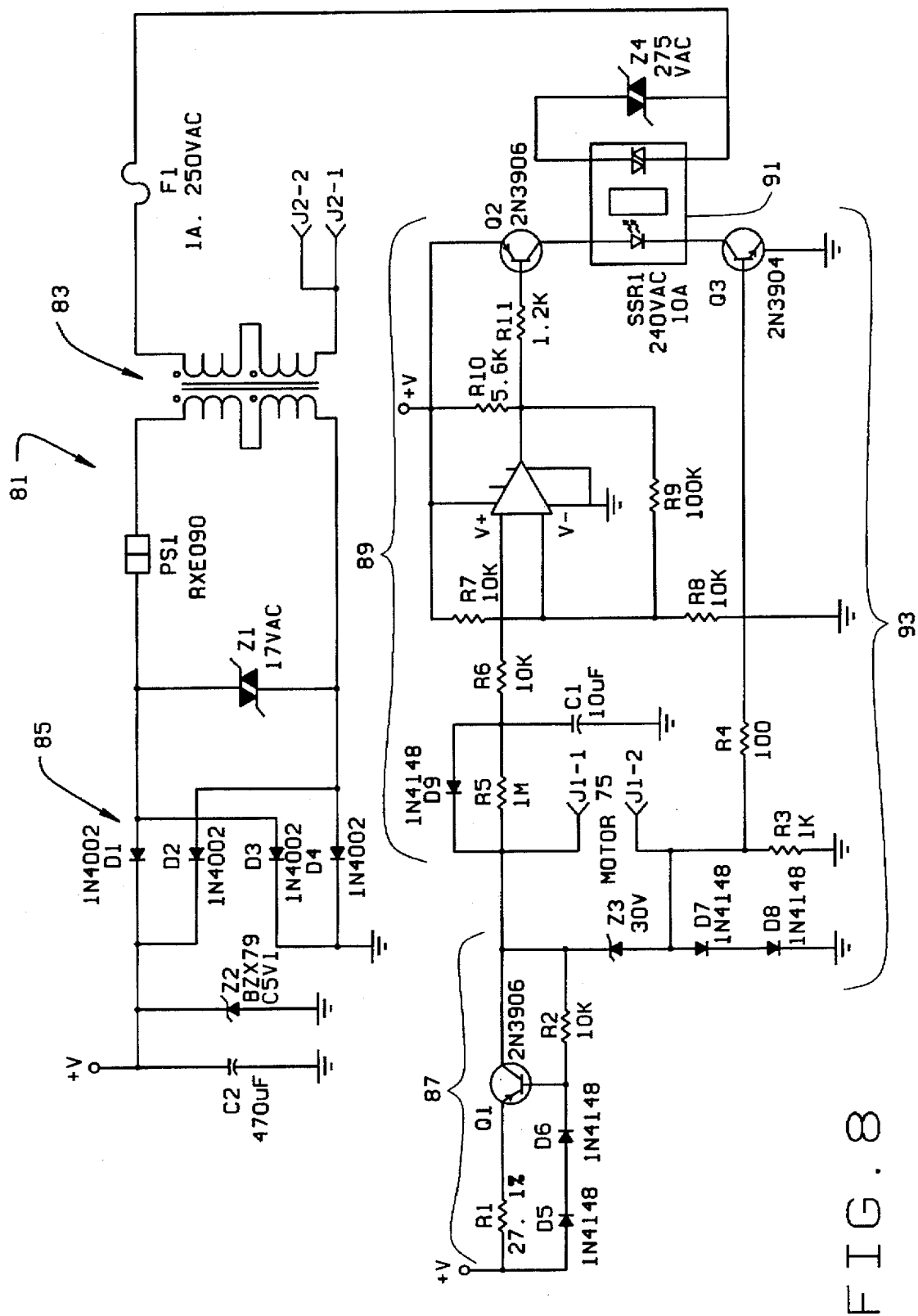
FIG. 8 is a schematic of the electrical circuit for energizing the electric motor shown in FIGS. 6 and 7 and for detecting when the paddle and the shaft of the motor are held against rotation by feed of a desired level in contact with the paddle.

Referring now to the drawings, and more particularly to FIG. 1, a poultry house is indicated by reference character 1. A poultry feeding system 3 is located within the poultry house for feeding a flock of birds or the like. It will be understood that poultry house 1 may, for example, be about 40-60' wide and hundreds of feet long and the flock of birds housed therein may number 40,000 or more. Feeding system 3 supplies feed to the flock. The poultry feed is a dry granular or powdered material which is flowable and which is generally referred to as a fluent material. The feeder system comprises a feed conveyor, as generally indicated at 5, having a multiplicity of pan feeders 7 positioned at spaced intervals (e.g., every 2 or 3 feet) along the length of the feed conveyor. The feed conveyor comprises a conveyor tube or conduit 9 formed in an endless loop and having a plurality of the pan feeders 7 spaced at such intervals therealong. There may be several hundred of the pan feeders 7 provided on feed conveyor 5. Those skilled in the art will recognize that the feed level sensor of the present invention which will be hereinafter described in detail may by utilized with virtually any type of powered conveying system.

As best shown in FIG. 2, feed conveyor 5 has an auger 11 disposed within conveyor tube 9. Generally, this auger is an open helical coil-like member having its flights spaced at equal intervals there along. This auger is preferably a flexible, centerless auger so as to enable it to readily go around the corners of the endless loop formed by conveyor tube 9. The feed conveyor system 5 further comprises a drive, as indicated at 13, for axially driving auger 11 through the length of the endless conveyor tube 9. This drive may be a gear driven by an electric motor or the like with the gear having teeth in mess with the flights of the auger. Details of this drive may be as shown in U.S. Pat. No. 4,460,230 with is herein incorporated by reference.

A so-called bulk feed tank, as generally indicated at 15, is located outside poultry house 1 for having a supply of poultry feed delivered thereto by means of a bulk delivery truck or the like. This bulk feed tank, for example, may contain several tons of feed. It will be appreciated that poultry feed is a dry fluent material consisting primarily of soy bean meal, corn meal, and other ingredients. As such, the poultry feed is a dry solid material (i.e., a fluent material) which is capable of flowing and being conveyed by means of the auger through conveyor tube 9.

Feed is supplied to feed conveyor 5 by means of a supply conveyor 17 having a supply conveyor tube 19 with an auger 21 mounted therein. This supply conveyor differs in construction and operation from feed conveyor 5 in that the auger 21 of the supply conveyor is rotatably driven within supply conveyor tube 19 by means of an electric motor 23 preferably positioned at the end of supply conveyor tube 19 distal from bulk feed tank 15. It will be recognized that auger 21 thus acts as a screw conveyor to axially move the poultry feed from the bulk feed tank into the poultry house 1. One or more of feed hoppers 25 are disposed to receive feed from feed supply conveyor 17 by means of a drop tube 27 connected to supply conveyor tube 19 and delivering feed into the interior of hopper 25, as best shown in FIG. 3. In this manner, a supply feed is contained within the hopper 25 and is directed downwardly through a feed inlet 29 in the base of the hopper for delivery of the feed into feed conveyor 5 for being picked up by auger 11 as the auger moves past feed inlet 29.

In accordance with this invention, a feed level control sensor, as generally indicated at 31, may be provided in hopper 25 so as to control operation of supply conveyor 17. More particularly, this feed level control sensor 31 will stop operation of feed supply conveyor 17 when the feed level FL within hopper 27 is at or above a desired feed level indicative of a desired quantity of feed within the hopper. Further, feed conveyor system 5 is provided with a feed control feeder pan, as generally indicated at 33 in FIG. 2, for stopping operation of feed conveyor 5 when the feed control pan 33 has a predetermined amount of feed delivered thereto. The feed control pan is also provided with a feed level control sensor 31 of the present invention.

Referring now to FIG. 4, a prior art feed level control unit is indicated in its entirety at 35 with this prior art feed level control unit intended to be mounted within the hopper 25 for controlling operation of supply conveyor 17 to deliver a predetermined quantity of feed to the hopper. This prior art feed level control unit comprises a bracket 37 which is adapted to be secured to the side wall of hopper 25. A control switch assembly, as generally indicated at 39, is mounted for vertical adjustment on the bracket, so as to be adjustably mounted in vertical direction to accommodate a range of desired feed levels FL within hopper 25. Control switch assembly 39 includes a micro switch 41 which has a pivotally mounted switch arm 43 carrying a feed paddle 45. Feed paddle 45 is oriented in a substantially vertical position such as the feed is delivered into hopper 25 by means of drop tube 27 and as the feed level rises within the hopper so as to contact the paddle, the weight of the feed will push against the paddle and trip micro switch 41 thereby to initiate a signal which can be used to terminate operation of supply conveyor 17.

More particularly, as shown in FIG. 4, this prior art feed level control unit 31 includes a mounting plate 47 to which micro switch 41 is mounted. In turn, mounting plate 47 is adjustably secured to vertical bracket 37 by means of the elongate vertical slots shown in FIG. 4 in bracket 37. It will be noted that switch 41 is adjustably mounted within mounting plate 47 so that between the vertically adjustable mounting plate 47 to bracket 37 and vertical adjustment between switch 41 and mounting plate 47, the vertical position of switch 41 and paddle 45 may be located so as to establish a desired feed level FL within hopper 25. However, it will be appreciated that because several of the parts and the micro switch are adjustable, there are several movable parts that may loosen and become out of adjustment. Thus, a worker must be careful when rigging the switch to actuate at a desired feed level. A U-shaped shroud 49 fits over switch 41 and paddle 45 so as to form a vertical chute for the feed. Paddle 45 is moveable back and forth within the chute such that the weight of the feed entering or building within the shoot serves to actuate switch 41.

Referring now to FIG. 5, the more salient components of feed control pan 33 are illustrated. The feed pan includes a connection, as indicated at 51, for receiving conveyor tube 9 and for connecting the control pan to the conveyor tube. It will be understood that conveyor tube 9 has an opening (not shown) in its lower regions in register with connector 51 such that feed conveyed through the conveyor tube is discharged into the connector at the location of feed control pan 33. Further, the feed control pan includes a drop tube 53 in which a paddle member 55 is pivotally mounted. Within this feed control pan, the above noted prior art feed level sensor 31 is shown to comprise a micro switch 57 which is carried by drop tube 53 so as to be actuated upon pivotal movement of paddle 55 as caused by the feed level within drop tube 53 rising above a predetermined feed level. As is typical, the control unit includes a feed pan 59 and a grill assembly 61.

Referring now to FIGS. 6 and 7, a feed pan control unit, as generally indicated at 63, is shown which includes a feed level sensor, as generally indicated at FLS, of the present invention. More specifically, feed pan control unit 63 is shown to comprise a connector 65 for connecting the feed pan control unit to conveyor tube 9. Feed pan control unit 63 includes a generally vertical drop tube 67 which receives feed from conveyor tube 9 in the conventional manner and a feed pan 69 disposed below the bottom end of drop tube 67 for receiving the feed from the feed pan. As shown in FIG. 6, the feed discharged from the bottom end of drop tube 67 will tend to spread out on a conical projection 70 on feed pan 69. The slope of conical projection 70 substantially matches the angle of repose R characteristic of the particular feed mixture being used so as to form a thin, uniform layer of feed on the conical projection and a small accumulation of feed in the lowermost regions of the feed pan. It will be appreciated that the angle of repose of the feed within the feeder is dependent upon the flowability, density, and stickiness of the feed being used in the feeding system. When the feed in feed pan 69 has assumed its angle of repose when it reaches the bottom of drop tube 67, further feed delivered to the drop tube will not flow out of the drop tube and into the feed pan, but instead will fill the drop tube. Upon the drop tube becoming filled with feed, further feed conveyed to the filled feeder will be conveyed past the filled feeder to other feeders downstream therefrom. Control unit 63 may include a grill 71.

The feeder shown in FIG. 6 is illustrated as an adjustable feeder in which the feed pan can be raised and lowered between a shallow depth position (as shown in FIG. 6) and a deep pan position (not shown). Such a feeder is described in the co-assigned U.S. Pat. No. 5,311,839. However, within the broader aspects of this invention, those skilled in the art will realize that the construction and operation of the feeder utilized with the control may be any wide variety of conventionally known feeders.

Further in accordance with this invention, feed level sensor FLS includes a sensor, as generally indicated at 73, which is mounted within the feed control unit 63, and more particularly within the drop tube 67 of the feed control assembly 67, so as to sense when the feed level FL within the feed control unit is at a desired or a predetermined level. Specifically, sensor 73 comprises a miniature electric motor 75 having a rotor therewithin (not shown) which is rotatably driven by the motor. The rotor is connected to an output shaft 77 on which is mounted a paddle assembly 79 for rotation with the output shaft. Preferably, motor 75 is a miniature electric motor of such small size that it can be readily mounted within drop tube 67 in such manner that it may be vertically adjustable within the drop tube so as to vary the feed level FL to the drop tube. It will appreciated that drop tube 67 may be a telescopically adjustable member such that the bottom end of the drop tube along with motor 75 may be raised and lowered relative to feed pan 69 so as to permit further selective adjustment of feed level FL within feed pan 69. Those skilled in the art will recognize that the sensor of the present invention is quite small having an overall length of less than about 1.5 inches and a diameter of about 1 inch. Thus, the sensor may be located in substantially any desired location where it is desired to determine the feed level within a wide variety of tubes and other vessels.

Preferably, motor 75 is a miniature (i.e., small size) D.C. electric motor commercially available from Douglas International, Inc. and identified by Model No. KE559 (U538). Paddle assembly 79 is shown to be a paddle affixed to and rotatable with output shaft 77 such that the paddle assembly rotates with the output shaft. For example, such an electric motor may have a housing length of about one (1) inches and a diameter of about 1.4 inches.

When motor 75 is energized at its specified rated voltage, the output shaft 77 will rotate at approximately 4000 rpm under its no load condition and it will draw about 7 milliamps at 14 VDC and therefore has a motor impedance of about 2KΩ. Those skilled in the art will recognize that as the paddle assembly 79 comes into contact with the feed (or other fluent material whose level is to be sensed) deposited with the feed pan 69, the resistance of the feed contacted by the paddles is sufficient to inhibit or stop rotation of the paddle assembly 79 and output shaft 77 thus, in effect, locking the rotor of the motor against further rotation. Under such locked rotor conditions, the motor will have a significantly lower impedance (e.g., about 67 ohms) such that the current regulator in the control circuit, as shown in FIG. 8 and will be hereinafter described will lower the motor voltage to 3 V DC to maintain a maximum motor current of 33 milliamps than if the paddle were free to rotate. It will be appreciated, however, if output shaft 77 is held against rotation for even extended periods of time, the locked rotor current is regulated to be below the full load running current such that the locked rotor current draw of motor 75 will not harm or damage the motor. Upon the feed moving clear of paddle 79, the motor will resume rotating and the voltage supplied to the motor will increase to maintain proper operating current.

In accordance with this invention, the feed level sensor FLS included means, as will be described in detail hereinafter, for sensing when the motor is free to operate and when the paddle assembly is held against rotation by the feed thereby to indicate the presence or absence of feed at a desired feed level corresponding generally to the location of paddle assembly 79. It will be appreciated that the vertical position of the paddle assembly 79 in its vessel or conduit establishes the feed level FL at which the sensor will detect the presence (or absence) of feed at the desired feed level.

Referring now to FIG. 8, an electronic circuit is depicted constituting means for energizing motor 75 and for generating a signal responsive to the inhibiting or stoppage of rotation of output shaft 77 of electric motor 75, as to indicate that the feed within the control unit (or other suitable solid fluent material) has come into contact with the paddle assembly 79 mounted on the output shaft 77 to thus sense the presence or absence of the solid fluent material at a level corresponding to the level of the paddle assembly within the feed control unit.

Referring now to the electrical schematic shown in FIG. 8, the circuit provides means for energizing motor 75 and means for generating a signal response to stoppage of rotation of output shaft 77 of motor 75 to thus indicate that the fluent material (e.g. poultry feed or the like) has come into contact with the paddle assembly 79 mounted on the output shaft thus stopping rotation of the output shaft 77 of the motor. In this manner, the presence of the solid, fluent material at a level of the paddle assembly may be sensed or detected. It will be understood that if the fluent material is holding the paddle assembly against rotation and the feed level FL drops below the level of the paddle assembly, the latter will be free to rotate and thus the circuitry of the present invention, with minor alterations as would be readily apparent to those skilled in the art, would indicate the absence of the feed at the desired level. In such cases, the control circuit could generate a signal which would initiate operating of the feed conveyor or some other apparatus in another application.

The circuit shown in FIG. 8 is powered by a source of AC line voltage (e.g., 240 volts). The circuit is provided with a transformer 83 to step down the AC line voltage to a lower voltage level (e.g., 24 $V_{RMS}$). As indicated at 85, a diode bridge rectifier is provided for transforming the AC power into DC power. The voltage output +V of the rectifier bridge 85 is connected to the input side of a current regulator circuit, as generally indicated at 87, so as to regulate the DC current supplied to motor 75. The output of the current regulator 87 is connected to one of the terminals, as indicated at J2, of motor 75. The other terminal of motor 75, as indicated at J1, is connected to a signal conditioning circuit as generally indicated at 89. Signal conditioning circuit 89 senses whether output shaft 77 of motor 75 is held against rotation. It will be appreciated that if the output shaft 77 of motor 75 is held against rotation, the motor is in a "locked rotor" condition in which the impedance of the motor is appreciably less than the impedance of the motor when the output shaft is free to rotate (e.g., 67 ohms when the rotor is locked vs. 2000 ohms when the rotor is free to rotate). This locked rotor condition causes the motor to operate at a somewhat different voltage than if the motor were free to rotor the output shaft and paddle assembly. Preferably, it is this change in voltage rather than a change in current supplied to the motor that is sensed to determine whether the motor is in its locked rotor condition or whether the motor is free to rotate. However, those skilled in the art will recognize that other ways of sensing whether the motor is in its locked rotor condition or is free to rotate may be utilized. For example, the current supplied to the motor may be monitored rather than the voltage. The output of the signal conditioning circuit serves as an input to a solid state relay 91. More specifically, the signal conditioning circuit 89 includes a transistor Q2 whose output serves as one input to the solid state relay 91.

It will be appreciated that as the rotor of motor 75 is held against rotation, the current regulator 87 shown in shown in FIG. 8 reduces the voltage supplied to the motor so as limit the current to the motor such that under such locked rotor conditions, the motor is not damaged.

Further, an open motor circuit failure protective circuit, as generally indicated at 93, is also provided. This circuit determines whether or not motor 75 is supplied with current or voltage which should cause the motor to operate. The output of this open circuit failure protector is constituted by a transistor Q3 whose output serves as the other input to solid state relay 91. As indicated, conditioning circuit 89 is set up so that when motor 75 is operating normally with its output shaft 77 free to rotate, the output of transistor Q2 will be present as one of the inputs to solid state relay 91. Additionally, the output of transistor Q3 of the open circuit motor failure protector 93 is also present to the solid state relay thus closing the solid state relay and permitting operation of the 13 of feed conveyor 5. It will be appreciated that the outputs of both transistors Q2 and Q3 are preferably required to permit the solid state relay 91 to close and to effect operation of the conveyor drive 13 thus permitting operation of the feed conveyor 5.

Upon output shaft 77 of motor 75 being restrained from rotation (as occasioned by the level of the feed within feed pan control 63 rising to a predetermined level, as indicated at FL within drop tube 67 in FIG. 6 such that paddle assembly 79 comes into contact with the feed), the resulting locked rotor condition is sensed by the signal conditioning circuitry 89 such that transistor Q2 will supply a signal to solid state relay 91 to open the relay and to thus prevent energization of motor 75.

In this manner, pan control 63 having level sensor 73 of the present invention installed therein (as shown in FIG. 6) will terminate operation of the feed conveyor upon the feed level FL within control unit 63 reaching a preset level, as determined by the vertical position of motor 75 and paddle 79 within drop tube 67. The vertical position of the motor and paddle assembly may be adjusted relative to the drop tube and the drop tube may be adjusted relative to the bottom of the pan so as to control the feed level FL within control unit 63.

As shown in FIG. 1, control unit 63 is mounted at the end of the loop of feed conveyor 5 such that it constitutes the last of the multiplicity of feeders 7 supplied by conveyor tube 9. Starting with all of the feeders in an empty or partially empty condition, upon start up of the drive motors 13 for conveyor 5, auger 11 in propelled in axial direction through the conveyor tube 9 in generally clockwise direction (as shown in FIG. 1) around the closed loop feed conveyor 5. As above described, feed from bulk feed tank 15 is deposited in hoppers 25 and this feed is delivered to the feed conveyor 5 via feed inlet 29 in the bottom of the hopper. As the auger 11 moves past the feed inlet, feed will be drawn into feed conveyor 5 and will first be delivered to a first feeder 7 immediately downstream from feed hopper 25. Once this first feeder becomes fully filled with feed (i.e. filling the feed pan to a desired level FL, as established by the position of the drop tube within the feeder and further fully filling the drop tube), feed will be conveyed past this filled feeder and on to subsequent feeders downstream therefrom until such other feeders become fully filled with feed. Such filling operation will proceed substantially progressively around the loop of feed conveyor tube 9 until such time as the feed control unit 63 at the downstream end of the loop becomes filled with feed. As the feed within the feed control units 63 reaches the predetermined level FL (as shown in FIG. 6), the lower portions of paddle assembly 79 will come into contact with the feed and will thus stop rotation of the paddle assembly and output shaft 77 thus constituting the locked rotor condition for motor 75. As previously described, in response to sensing this locked rotor condition, the signal conditioning circuit 89 will thus generate a signal causing solid state relay 91 to open thereby deenergizing the drive motors 13 for feed conveyor 5.

Those skilled in the art will recognize that while the circuitry of FIG. 8 is responsive to the stoppage of motor shaft 77, other sensors, such a shaft speed encoders, may be used to sense the slow down of the output shaft upon paddles 79 coming into contact with the feed at the desired level or upon the feed moving clear of the paddles. Within in the broader meaning of this invention, the term "inhibiting rotation of output shaft 77" means either stoppage or a slow down of the rotation of the shaft.

When operation of the feed conveyor 5 is terminated in response to the signal generated by the sensor 73 of the present invention located in a feed control unit 63 located at the end of the feed conveyor path in the above described manner, it will be appreciated that all of the feeders 7 along the feed conveyor path have been fully filled with their desired amount of feed. It will be further appreciated that the segments of conveyor tube 9 between the feeders will have a charge of poultry feed therein. Thus, upon start up of feed conveyor 5, the charge of feed contained within conveyor tube 9 between each of the feeders 7 will be substantially simultaneously dumped into each of the feeders 7 around the closed loop of feed conveyor 9 so as to initially provide a small amount of feed within each of the feeders 7. In this manner, birds within poultry house 1 will have no incentive to run to the first of the feeders which receive feed upon start up of the feed conveyor.

In accordance with this invention, sensor 73 (i.e. motor 75, paddle assembly 79 and the electronic circuitry as shown in FIG. 8) may be utilized with a wide variety in applications where it is desired to sense either the presence or absence of a solid fluent material. For example, motor 75 may be installed within a feed level controller, such as generally shown in FIG. 4, in place of micro switch 41 and paddle member 45. In this manner, the sensor 73 may be utilized to control operation of the supply conveyor 17 for conveying feed from the bulk feed tanks 15 to hoppers 25. As such, when the feed level Fl, as shown in FIG. 3 falls below the level of the paddles 79, motor 75 is thus free to rotate thus initiating operation of conveyor motor 23 so as to operate feed delivery conveyor 17 to supply feed from bulk feed tanks 15 to hoppers 25. As the feed fills the hoppers and as the feed level approaches the predetermined level FL as shown in FIG. 3, the feed will once again contact that rotating paddles and will thus stop rotation of motor 75 thus lock the rotor of the motor against further rotation. Thus, the circuitry shown in FIG. 8 will generate a signal which causes solid state relay 91 to open thus terminating operation of conveyor motor 13.

Those skilled in the art will recognize that instead of connecting the output of the signal conditioning circuit 89 shown in FIG. 8 to a solid state relay 91 which in turn controls deenergization of the feed conveyor motors, such a signal may be utilized to energize or deenergize a suitable warning light. This application may be particularly advantageous if the sensor 73 were, for example, provided within the upper reaches of the bulk feed tank 15 and if the indicator light were provided on a panel adjacent the base of the bulk feed tank so that a delivery truck operator would be able to determine upon loading feed into the bulk feed tank when the tank was substantially filled with feed. Of course, those skilled in the art can recognize numerous other applications for sensor 73 which senses the presence or absence of a solid fluent material in a vessel, container, conduit or the like.

While the above described sensor 73 and the electronic circuitry shown in FIG. 8 has been described to generate a signal and to terminate operation of the feed conveyor drives in response to the paddle assembly 79 engaging the solid fluent material (e.g. poultry feed) when the fluent material has attained a predetermined feed level FL, it will be recognized that with suitable minor changes to the circuitry shown in FIG. 8 operation of feed conveyor motors could also be controlled by the absence of feed engaging the paddle assembly.

Referring to FIG. 9, a drop feeder (or other feed accumulating structure, such as a large silo or grain bin), as generally indicated at 101, is shown having a housing 103, a feed inlet 105, a main feed accumulating chamber 107, a control passage 109, and a selectively openable gate or valve 111 for discharging a desired quantity or volume of feed from the drop feeder.

More specifically, feed may be delivered to the main accumulating chamber 107 by means of an overhead feed conveyor (not shown) via feed inlet 105. Upon the main accumulating chamber becoming filled with feed, the incoming feed will spill over a vertical control wall 113 and the feed will begin to fill control passage 109. A sensor 73 of the present invention is located at a desired height relative to the control passage 109 until the feed level reaches the elevation of paddle 79 at which point the feed will prevent the paddle for rotating. As noted, the stoppage of motor 75 from rotating generates a signal responsive to the level of feed within the control passage from reaching a predetermined depth at which point the flow of feed into the main feed chamber may be terminated. As feed is discharged from the main chamber 107, there will be no drop in the level of the feed in the control passage 109 until such time as the level of feed in the main chamber drops below the level of feed in the control passage which is generally at the level of the motor 75. As the level in the main chamber drops below the initial level in the control chamber, the further discharge of the feed from the main chamber will cause the level in both the main chamber and the control chamber to drop. As the level of the feed in the control chamber drops below the level of motor 75, the motor will once again be free to rotate and thus will generate a signal indicating that the feed level in the main chamber has dropped below a predetermined level. This signal can then be used to initiate operation of the filling conveyor to deliver more feed into the main chamber via feed inlet 105. It will be appreciated that the main chamber will thus continue to fill with feed and upon the feed reaching the level of the upper edge of control wall 113, the feed will then spill into the control chamber until it reaches the level of the paddles 79 on motor 75 thus stopping rotation of the motor. As previously described, stoppage of motor 75 will generate another signal which can be used to shut off operation of the feed conveyor supplying feed. It will be appreciated that by selectively positioning sensor 75 at a desired height within control chamber 109, one may selectively set the level of the feed within the main chamber at which the inlet feed conveyor is activated to begin to load additional feed into the main chamber.

While the above described drop feeder 101 has been described as for use in, for example an automated hog feeding system, it will be understood by those skilled in the art that the feed level control principles described could be applied is a wide variety of applications where it is desired to accumulate a quantity of any dry, solid, fluent or flowable material in a main chamber and to re-fill the main chamber upon the level of the material in the main chamber falling to a predetermined level. For example, this control strategy could be used to maintain a desired level of grain in a grain silo, or a desired level of plastic pellets in an accumulator feeding a plastic molding machine or the like.

In view of the above, it will be seen that the several objects and features of this invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A sensor for detecting a predetermined level of a solid, fluent material, said sensor comprising an electric motor having an output shaft which rotates upon energization of the motor, means for energizing said motor, means mounted on said output shaft and rotatable therewith for engagement with said solid, fluent material when the latter is at or above said predetermined level thereby to stop rotation of said output shaft, and means responsive to the stoppage of rotation of said output shaft for indicating that solid, fluent material has attained said predetermined level said indicating means comprising means for monitoring the electrical parameters supplied to said motor for energization thereof, and means for generating a signal upon at least one said electrical parameters changing to a predetermined value responsive to the stoppage of the rotation of said motor.

2. A sensor as set forth in claim 1 wherein said means for indicating that said solid, fluent material has attained said predetermined level comprises means for generating an electrical signal in response to stopping of rotation of said output shaft of said motor.

3. A sensor as set forth in claim 1 wherein said means for generating said signal comprises means for sensing when said output shaft is held against rotation while said motor is energized.

4. A sensor as set forth in claim 1 wherein said indicating means detects the voltage supplied to said motor and when said voltage is outside of a predetermined limit, said signal is generated indicating that said output shaft of said motor is held against rotation.

5. A sensor as set forth in claim 1 further comprises means for regulating the current supplied to said motor to be within a predetermined current range, and wherein said indicating means detects when said voltage supplied to said motor is of a predetermined value corresponding to the voltage when said motor is supplied with said regulated current and said output shaft of said motor is held against rotation.

6. A feed level sensor for sensing when the feed within a vessel of a feed conveyor or the like is at or above a predetermined feed level within said vessel, said sensor comprising an electric motor adapted to be mounted in said vessel, said motor having a rotatable output shaft and a paddle carried on said output shaft, said paddle being rotatable with said output shaft, the level of said paddle within said vessel corresponding to said desired feed level, a power supply for energizing said motor and for causing said output shaft to rotate, said paddle when in contact with said feed at said predetermined feed level stopping said output shaft from rotating, and an electrical circuit generating a signal in response to stoppage of said output shaft from rotating thereby to indicate that the level of said feed within said feeder is at or above said desired feed level, said electrical circuit monitoring the voltage supplied to said motor an when said voltage is outside of a predetermined range, said signal being generated indicating that said feed level has attained said desired level and said feed has restrained said output shaft of said motor against rotation.

7. A sensor as set forth in claim 6 wherein said power supply includes means for regulating the current supplied to said motor to be within a predetermined range, and wherein said electrical circuit comprises means for monitoring the voltage supplied to said motor such that when said voltage is outside of a predetermined range corresponding to said output shaft being held against rotation.

8. A vessel for accumulating a quantity of a dry, fluent material in a accumulating chamber therein, said accumulating chamber having an inlet for the introduction of said fluent material therein, an outlet for the discharge of said fluent material from within said accumulating chamber, a control wall forming a portion of said accumulating chamber, said control wall having an upper edge thereof such that upon filling of said accumulating chamber with said fluent material to the level of said upper edge of said control wall, continued introduction of said fluent material into said accumulating chamber will cause at least a portion of said fluent material to spill over said upper edge of said control wall, a control chamber positioned to receive said fluent material that spills over said upper edge of said control wall, and a sensor disposed in said control chamber for detecting a predetermined level of said fluent material within said control chamber, said sensor comprising an electric motor having an output shaft which rotates upon energization of the motor, means for energizing said motor, means mounted on said output shaft and rotatable therewith for engagement with said fluent material when the latter is at or above said predetermined level thereby to stop rotation of said output shaft, and means responsive to the stoppage of rotation of said output shaft for indicating that solid, fluent material has attained said predetermined level.

9. A vessel as set forth in claim 8 wherein said control chamber is in communication with said accumulating chamber below the level of said sensor and above the level of said outlet for said accumulating chamber such that as said fluent material is discharged from within said accumulating chamber via said outlet to a level below the level of said sensor in said control chamber, said fluent material within said control chamber will begin to be discharged from within said control chamber such that said fluent material will drop below the level of said sensor so as to enable said output shaft of said motor to rotate.

10. A vessel as set forth in claim 8 wherein said fluent material is feed, and wherein said vessel is a drop feeder which accumulates a predetermined quantity of feed within said main accumulating chamber which may be selectively discharged into a feeder or the like upon opening of said outlet.

11. A vessel as set forth in claim 8 wherein said main accumulating chamber is a storage silo or the like for said fluent material.

12. A vessel as set forth in claim 8 wherein said upper edge of said control wall is adjustable in a vertical direction so as to selectively vary the level of fluent material accumulated within said accumulating chamber.

13. A vessel as set forth in claim 9 further comprising a conveyor for delivery of said fluent material into said accumulating chamber, and wherein said sensor is vertically adjustable within said control chamber so as to correspondingly adjust the level of said fluent material within said accumulating chamber at which level said sensor reinitiates operation of said delivery conveyor.

14. A method of sensing the level of a fluent material in a vessel comprising the steps of positioning an electric motor within said vessel generally at a level corresponding to a desired level of said fluent material in said vessel, said motor having an output shaft rotatably driven by said motor, said output shaft having means mounted thereon which when engageable with said fluent material inhibits said output shaft from rotating, said method further comprising the steps of supplying an electrical input to said electric motor, monitoring said electrical input to said motor, and, in response to a change in the electrical input to said motor being outside of a predetermined range caused by an inhibiting of rotation of said output shaft and thus generating said signal indicating that said feed level is at or above said predetermined level, and generating a signal in response to inhibiting of rotation of said output shaft so as to indicate that the level of said fluent material within said vessel has attained or exceeded said desired level.

15. The method of claim 14 wherein said fluent material is poultry feed, and wherein said vessel is a poultry feed conveyor control unit for a poultry feed conveyor which delivers feed to a plurality of poultry feeders, said method further comprising stopping operation of said poultry feed conveyor from further delivering feed to said feeders upon the feed within said control unit attaining said desired feed level therein.

16. The method of claim 14 wherein said step of monitoring the electrical input to said motor comprises regulating the current supplied to said motor to a predetermined amount and sensing a change in the voltage supplied to said motor in response to the inhibiting of rotation of said output shaft as occasioned by the engagement of said output shaft with said fluent material at or above said desired level.

17. A sensor for detecting the predetermined level of a solid, fluent material within a receptacle, said sensor comprising an electric motor having an output shaft which rotates upon energization of the motor, a power supply for energizing said motor, said output shaft being engageable with said solid, fluent material when the latter is at or above said predetermined level thereby to stop rotation of said output shaft, and an electronic circuit responsive to the stoppage of rotation of said output shaft by said solid, fluent material for generating a signal indicating that said solid, fluent material has attained said predetermined level within said receptacle, said power supply continuing to supply electrical power to said motor while said motor is held against rotation by said solid, fluent material, upon said fluent material falling below the said predetermined level such that said output shaft is again free to rotate, said electronic circuit generating another signal upon re-starting rotation of said output shaft indicating that said solid, fluent material dropped below said predetermined level.

* * * * *